United States Patent
Ikeda et al.

(10) Patent No.: US 6,419,362 B1
(45) Date of Patent: Jul. 16, 2002

(54) LIQUID CRYSTAL PROJECTION APPARATUS

(75) Inventors: Takashi Ikeda, Osaka; Hideyuki Kanayama, Kyoto, both of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/528,984

(22) Filed: Mar. 20, 2000

(30) Foreign Application Priority Data

Mar. 31, 1999 (JP) .............................. 11-093148

(51) Int. Cl.[7] .............................................. G03B 21/14
(52) U.S. Cl. ................ 353/20; 353/33; 349/9
(58) Field of Search ............... 353/20, 33, 31, 353/34, 37; 349/5, 8, 9

(56) References Cited

U.S. PATENT DOCUMENTS

| | | | | |
|---|---|---|---|---|
| 5,826,959 A | * | 10/1998 | Atsuchi | 353/20 |
| 6,176,586 B1 | * | 1/2001 | Hirose et al. | 353/31 |
| 6,183,091 B1 | * | 2/2001 | Johnson et al. | 353/20 |
| 6,247,814 B1 | * | 6/2001 | Lin | 353/20 |
| 6,247,816 B1 | * | 6/2001 | Cipolla et al. | 353/31 |
| 6,273,567 B1 | * | 8/2001 | Conner et al. | 353/20 |
| 6,309,071 B1 | * | 10/2001 | Huang et al. | 353/31 |

\* cited by examiner

*Primary Examiner*—William Dowling
(74) *Attorney, Agent, or Firm*—Arent Fox Kintner Plotkin & Kahn

(57) ABSTRACT

A PBS 31 for green and blue is used for separating a green light and a blue light and for combining green image light and blue image light, thereby to eliminate the necessity of letting light transmit an excessive path by using dichroic mirrors for color separation and a reflection mirror or the like.

12 Claims, 5 Drawing Sheets

LIQUID CRYSTAL PROJECTION APPARATUS

BACKGROUND OF THE INVENTION

The present invention relates to a liquid crystal projecting apparatus of three-panel type using three reflection-type light modulation elements such as a ferroelectric liquid crystal panel and, more particularly, relates to a miniaturization of a liquid crystal projecting apparatus.

An example of conventional liquid crystal projecting apparatuses using reflection-type liquid crystal panels will be shown in FIG. 5.

As shown in FIG. 5, such a conventional liquid crystal projecting apparatus separating portion separates a white light emitted from a lamp 101 into RGB primary colors, using a dichroic mirror 102 for reflecting a red component light (hereinafter abbreviated as a red light), mirror 103, and a dichroic mirror 104 for reflecting a green component light (hereinafter abbreviated as a green light).

The red light separated and reflected by the dichroic mirror 102 is incident on the major surface of a polarization beam splitter (hereinafter abbreviated as a PBS) 105, then is reflected to the direction perpendicular to the incident light by a polarization separation surface which reflects a S-polarized component and incident on a reflection type liquid crystal panel 106 for red. The reflection type liquid crystal panel 106 for red rotates the polarization direction of the red light being incident on the pixels of the portion to be displayed in red by 90 degrees, that is, converts the red light into P-polarized light and reflects it. Thus, the P-polarized red light incident again into the PBS 105 transmits the polarization separation surface and is incident on the first major surface of a dichroic prism 111 for color combining.

The green and blue light transmitting the dichroic mirror 102 is reflected to the direction perpendicular to the incident light by a reflection mirror 103 and irradiated on a dichroic mirror 104. The green light of the incident light is separated and reflected by the dichroic mirror 104 to the direction perpendicular to the incident light and incident on the major surface of the PBS 107. Like the red light, the reflection type liquid crystal panel 108 for green converts the green light being incident on the pixels of the portion to be displayed in green into P-polarized light, then the green light is emitted from the direction perpendicular to the incident light and incident on the secondmajor surface of the dichroic prism 111 for color combining.

Further, like the red and green light, the reflection type liquid crystal panel 110 for blue converts the blue light transmits the dichroic mirror 104 and being incident on the pixels of the portion to be displayed in blue into P-polarized light, then the blue light is emitted from the direction perpendicular to the incident light and incident on the third major surface of the dichroic prism 111 for color combining.

When the image lights of the RGB primary colors are incident on the first to third major surfaces of the dichroic prism 111 for color combining, the image lights are color-combined on the dichroic surface, then the combined light is emitted from a projection optics 112 and so a color image is displayed on a not-shown screen.

However, since such a conventional liquid crystal projecting apparatus is arranged in a manner that the reflection type liquid crystal panel is disposed at each of the three PBSs for surrounding the three sides of the dichroic prism, the dichroic mirrors for color separation etc. are required to be disposed so as to detour the outside of the PBSs. As a result, there arises a problem that the size of the apparatus becomes large. In particular, when such a conventional liquid crystal projecting apparatus is used as a projection unit for a liquid crystal projecting apparatus of rear projection display, such an apparatus may not be housed within a narrow casing.

SUMMARY OF THE INVENTION

Accordingly, the present invention has been made in view of the aforesaid problems of the prior art, and an object of the present invention is to miniaturize a liquid crystal projecting apparatus.

The liquid crystal projecting apparatus according to the present invention comprises:
- a light source portion for emitting light with predetermined polarization direction;
- a color separating portion for separating the light emitted from the light source portion into a first separation light including a first color component of three primary colors and a second separation light including a second and a third color components having different polarization direction to each other, and for emitting the first and the second separation lights to different directions perpendicular to each other;
- a first PBS disposed on the light emitting side of the first separation light of the color separating portion and having a first light modulating element of reflection type disposed on a major surface thereof on which the first separation light is incident;
- a second PBS disposed on the light emitting side of the second separation light of the color separating portion, and having a second light modulating element of reflection type disposed on a major surface thereof on which the second color component of the second separation light is incident and having a third light modulating element of reflection type disposed on a major surface thereof on which the third color component of the second separation light is incident;
- a color combining portion for combining the lights of the respective color components emitted from the first and the second PBSs; and
- a projection optics for projecting the combined light combined by the color combining portion.

According to such an arrangement, the first separation light separated by the color separating portion is incident on the first PBS and modulated by the first light modulating element of reflection type. The modulated first separation light transmits the first PBS and is emitted to the direction perpendicular to the incident light and then incident on the color combining portion. The second separation light is incident on the second PBS and separated into a second and a third color components so as to be directed to different direction perpendicular to each other. The second and the third color components thus separated are modulated by the second and the third light modulating elements of reflection type, respectively, then combined by the second PBS, then emitted to the direction perpendicular to the incident light and incident on the color combining portion.

The first and the second separation lights combined by the color combining portion is projected on a screen by the projection optics thereby to display an image.

To be more concrete, the color separating portion is formed by a third PBS which has on the light source portion side a first polarization direction rotating portion for rotating polarization direction of the first color component by 90 degrees and has on the second PBS side a second polarization direction rotating portion for rotating polarization direction of the second color component by 90 degrees, and the color combining portion is formed by a fourth PBS which has on the second PBS side a third polarization direction rotating portion for rotating polarization direction of the second color component by 90 degrees.

Each of the color separating portion and the color combining portion is formed by a dichroic beam splitter which reflects the first color component and transmitting the second and third color components, and the color separating portion has on the second PBS side a fourth polarization direction rotating portion for rotating polarization direction of the second color component by 90 degrees.

Each of the polarization direction rotating portions is formed by a narrow band retarder corresponding to the color component which polarization direction is to be rotated.

Each of the light modulating elements of reflection type is formed by a ferroelectric liquid crystal panel.

DETAILED DESCRIPTION OF THE PREFERRED EMBODIMENTS

First Embodiment

The configuration of the liquid crystal projecting apparatus according to a first embodiment of the present invention will be explained. In the following explanation, the explanation will be made as to the case where the present invention is applied to the projection unit of the projecting apparatus of rear projection display shown in FIG. 1.

Figure 1:
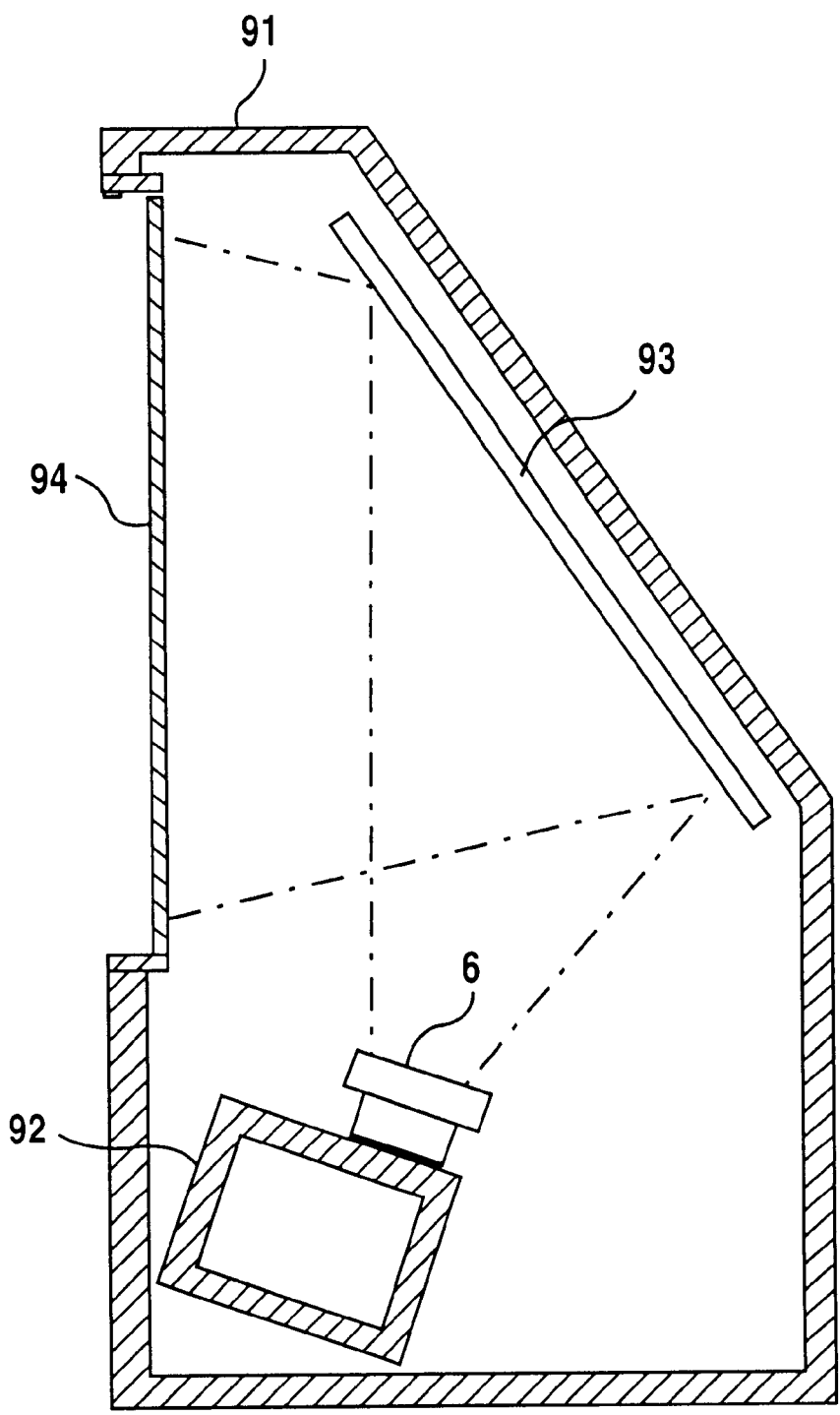
FIG. 1 is a diagram showing the schematic configuration of the projecting apparatus of rear projection display according to an embodiment of the present invention.

The projecting apparatus of rear projection display according to the embodiment includes, as shown in FIG. 1, a casing 91, a projection unit 92 disposed on the bottom surface of the casing 91, a reflection mirror 93 disposed on the rear surface and a screen 94 disposed on a front surface. The image light emitted from the projection optics 6 of the projection unit 92 is reflected by the reflection mirror 93 and projected on the screen 94.

Figure 2:
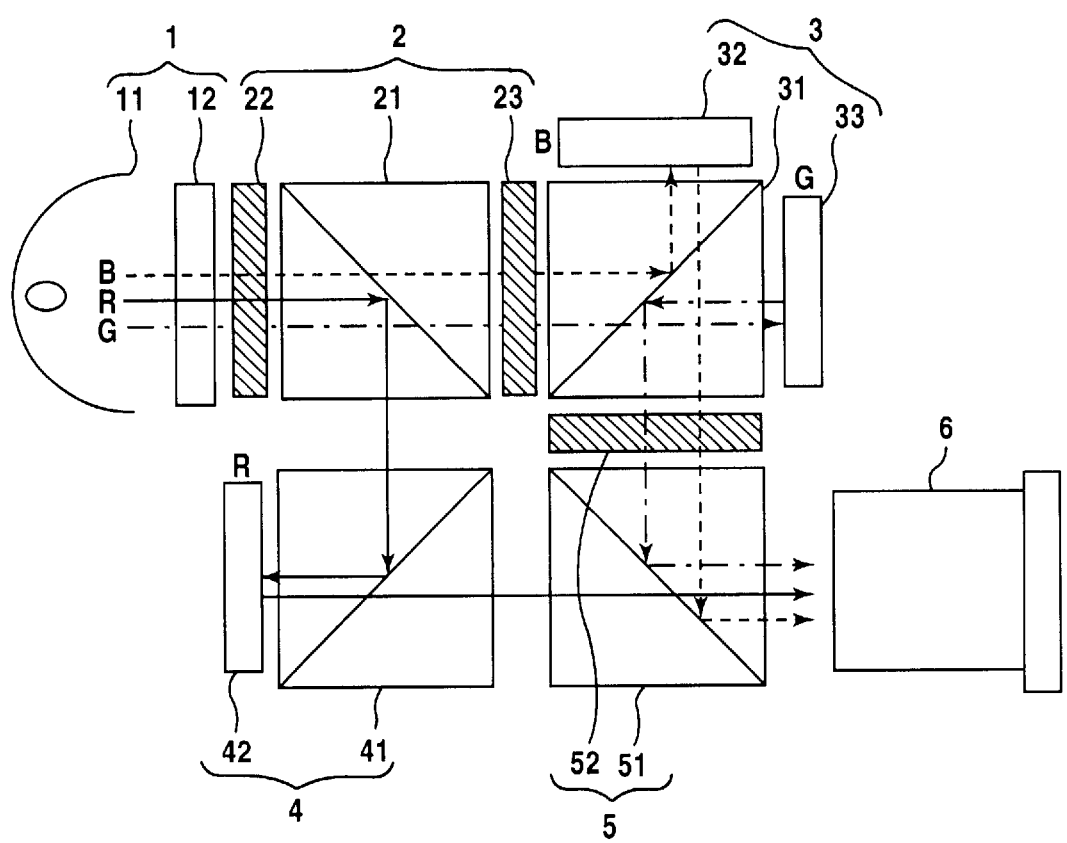
FIG. 2 is a diagram showing the first configuration of the projection unit mounted on the projecting apparatus of rear projection display of FIG. 1.

As shown in FIG. 2, the projection unit 92 is formed by a light source portion 1, a color separating portion 2, a GB modulating portion 3, an R modulating portion 4, a color combining portion 5 and the projection optics 6.

The light source portion 1 includes a lamp 11 and a polarizer 12. The polarizer 12 only transmits the P-polarized component of the white light emitted from the lamp 11.

The color separating portion 2 includes a color separation PBS 21, a narrow band retarder 22 for red disposed in opposite to the major surface on the light source portion 1 side of the color separation PBS 21, and a narrow band retarder 23 for blue disposed in opposite to the major surface on the GB modulating portion 3 side described later. The color separation PBS 21 reflects on a polarization separation surface thereof an S-polarized component of an incident light to the direction deviated by 90 degrees with respect to the incident light and also transmits a P-polarized component thereof. The narrow band retarder 22 for red rotates the polarization direction of the red light of the incident light by 90 degrees thereby to transmit it and also transmits other color component as it is. The narrow band retarder 23 for blue also rotates the polarization direction of the blue light of the incident light by 90 degrees thereby to transmit it and also transmits other color component as it is.

The GB modulating portion 3 includes a PBS 31 for green and blue, and a liquid crystal panel 32 for blue and a liquid crystal panel 33 for green disposed in opposite to the two adjacent major surfaces of the PBS 31 for green and blue, respectively. Like the color separation PBS 21, the PBS 31 for green and blue reflects on a polarization separation surface thereof a S-polarized component of an incident light to the direction deviated by 90 degrees with respect to the incident light and also transmits a P-polarized component thereof. Each of the liquid crystal panel 32 for blue and the liquid crystal panel 33 for green is a liquid crystal panel of reflection type which rotates the polarization direction of the light being incident on the pixels to be displayed by 90 degrees and reflects the light thus rotated, and reflects the light being incident on the other pixels as it is.

The R modulating portion 4 includes a PBS 41 for red and a liquid crystal panel 42 for red disposed in opposite to the major surface of the PBS 41 for red. The PBS 41 for red has the same configuration as the color separation PBS 21. The liquid crystal panel 42 for red is a liquid crystal panel of reflection type which rotates the polarization direction of the light being incident on the pixels to be displayed by 90 degrees and reflects the light thus rotated, and reflects the light being incident on the other pixels as it is.

The color combining portion 5 includes a color combining PBS 51 and a narrow band retarder 52 for blue disposed in opposite to the major surface on the GB modulating portion 3 side of the PBS 51.

In such a configuration, when the lamp 11 of the light source portion 1 emits the white light, only the P-polarized component of the white light transmits the polarizer 12 and is irradiated on the color separating portion 2.

In the color separating portion 2, the narrow band retarder 22 for red rotates the polarization direction of the red light of the P-polarized white light, that is, converts the red light into S-polarized light to make it incident on the color separation PBS 21. The S-polarized red light is reflected by the color separation PBS 21 on a polarization separation surface thereof and incident on the R modulating portion 4. Further, the P-polarized blue light and green light transmit the color separation PBS 21 and are incident on the narrow band retarder 23 for blue. The P-polarized blue light is converted into S-polarized light by the narrow band retarder 23 for blue and incident on the GB modulating portion 3 together with the P-polarized green light.

In the GB modulating portion 3, the S-polarized blue light is reflected by the PBS 31 for green and blue on a polarization separation surface thereof and incident on the liquid crystal panel 32 for blue. The liquid crystal panel 32 for blue rotates the polarization direction of the light being incident on the pixels to be displayed by 90 degrees, that is, converts into P-polarized light and reflects it. Further, the liquid crystal panel 32 for blue reflects the S-polarized light incident on other pixels as it is. The remaining P-polarized green light transmits the polarization separation surface of the PBS 31 for green and blue and is incident on the liquid crystal panel 33 for green. The liquid crystal panel 33 for green rotates the polarization direction of the light being incident on the pixels to be displayed by 90 degrees, that is, converts into S-polarized light and reflects it. Further, the liquid crystal panel 33 for green reflects the P-polarized light incident on other pixels as it is.

The P-polarized blue image light reflected by the liquid crystal panel 32 for blue and the S-polarized green image light reflected by the liquid crystal panel 33 for green are again incident on the PBS 31 for green and blue and combined on a polarization separation surface thereof. In this case, the P-polarized blue image light transmits the polarization separation surface, while the S-polarized green image light is reflected by the polarization separation surface, and each of the P-polarized blue image light and the S-polarized green image light is incident on the color combining portion 5.

The S-polarized red light, which is separated by the color separating portion 2 and incident on the R modulating portion 4, is reflected by the PBS 41 for red on a polarization separation surface thereof and incident on the liquid crystal panel 42 for red. The liquid crystal panel 42 for red rotates the polarization direction of the light being incident on the pixels to be displayed by 90 degrees, that is, converts into P-polarized light and reflects it. Further, the liquid crystal panel 42 for red reflects the S-polarized light incident on other pixels as it is. The P-polarized red image light reflected by the liquid crystal panel 42 for red is again incident on the PBS 41 for red. The P-polarized red image light transmits the polarization separation surface of the PBS 41 for red and is incident on the color combining portion 5.

In the color combining portion 5, the narrow band retarder 52 for blue rotates the polarization direction of the P-polarized blue image light emitted from the GB modulating portion 3 by 90 degree, that is, converts into S-polarized light. The S-polarized blue image light is incident on the major surface of the color combining PBS 51 together with the S-polarized green image light. The P-polarized red image light emitted from the R modulating portion 4 is incident on the major surface of the color combining PBS 51 which is perpendicular to the incident surface on which the S-polarized blue and green image lights are incident.

The S-polarized blue and green image lights and the P-polarized red image light are combined on the polarization separation surface of the color combining PBS 51 to form color image light.

This color image light is projected on the screen 94 through the projection optics 6 and the reflection mirror 93.

According to the embodiment, since the PBS 31 for green and blue is used for separating the green light and the blue light and for combining the green image light and the blue image light, it is not necessary to let the light transmit an excessive path by using dichroic mirrors for color separation and a reflection mirror or the like, so that the liquid crystal projecting apparatus can be miniaturized.

Second Embodiment

Then, the configuration of the projecting apparatus according to the second embodiment of the present invention will be explained.

The portions included in the projecting apparatus according to the second embodiment correspond to those of the projecting apparatus according to the first embodiment.

Figure 3:
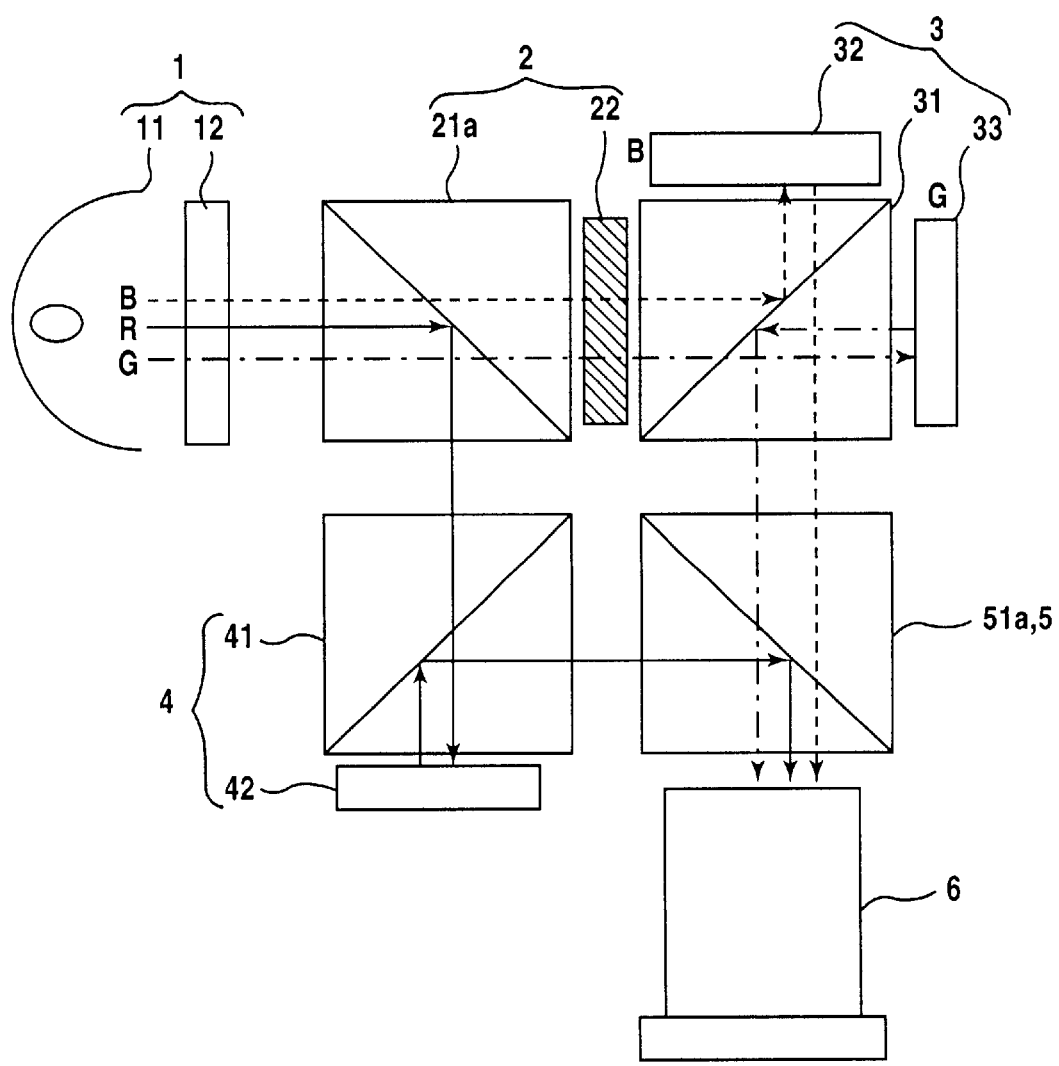
FIG. 3 is a diagram showing the second configuration of the projection unit mounted on the projecting apparatus of rear projection display of FIG. 1.

The projecting apparatus according to the second embodiment is arranged in a manner as shown in FIG. 3 that a first dichroic beam splitter 21a having a dichroic surface for reflecting the red light and transmitting the green and blue lights is employed in place of the color separation PBS 21 and the narrowband retarder 22 for red of the projecting apparatus in the first embodiment and that a second dichroic beam splitter 51a having the same characteristics as the first dichroic beam splitter 21a is employed in place of the color combining PBS 51 and the narrow band retarder 52 for blue.

According to the embodiment, the number of the parts can be reduced in addition to the miniaturization of the apparatus, the manufacturing process of the apparatus can be facilitated.

Figure 4:
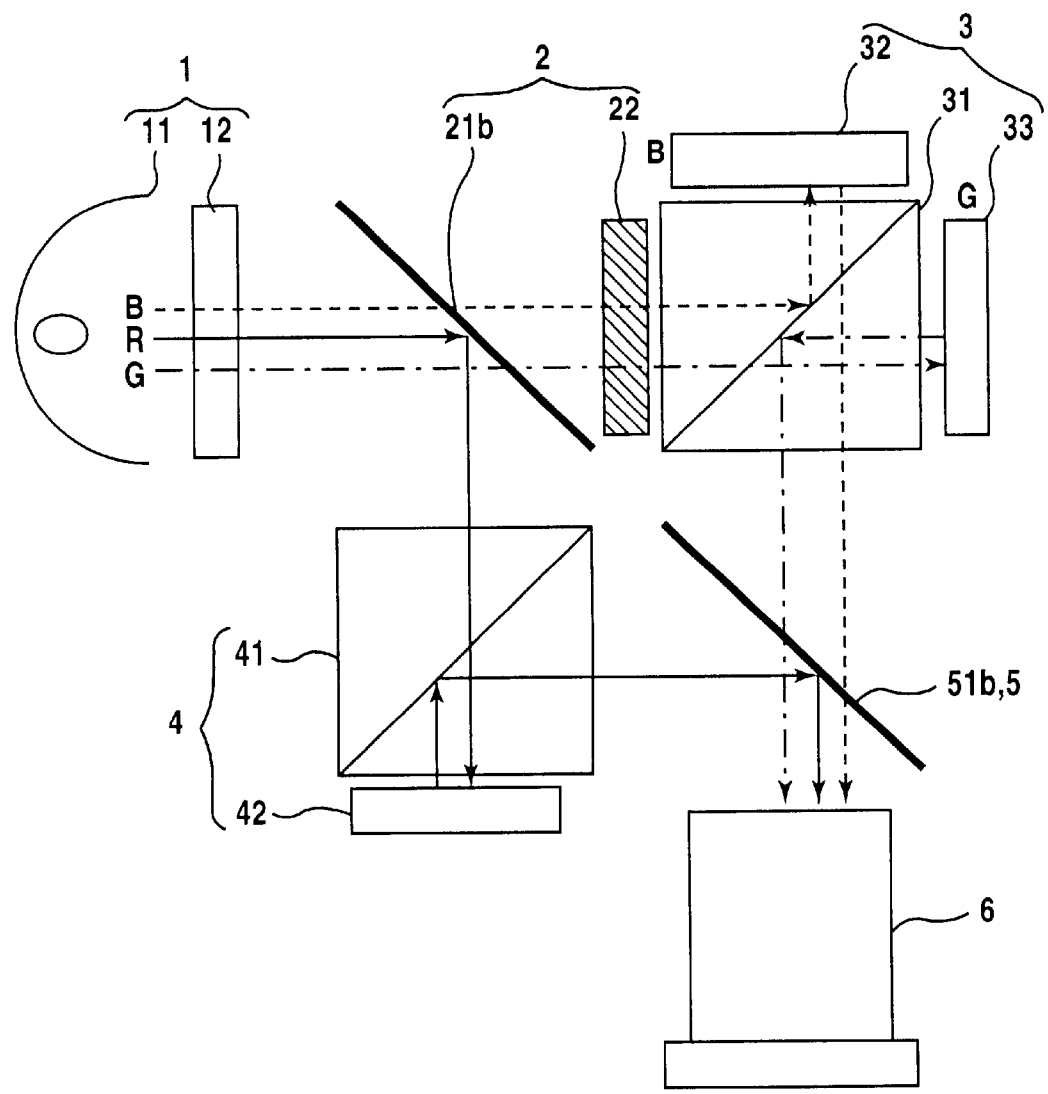
FIG. 4 is a diagram showing the third configuration of the projection unit mounted on the projecting apparatus of rear projection display of FIG. 1.
Figure 5:
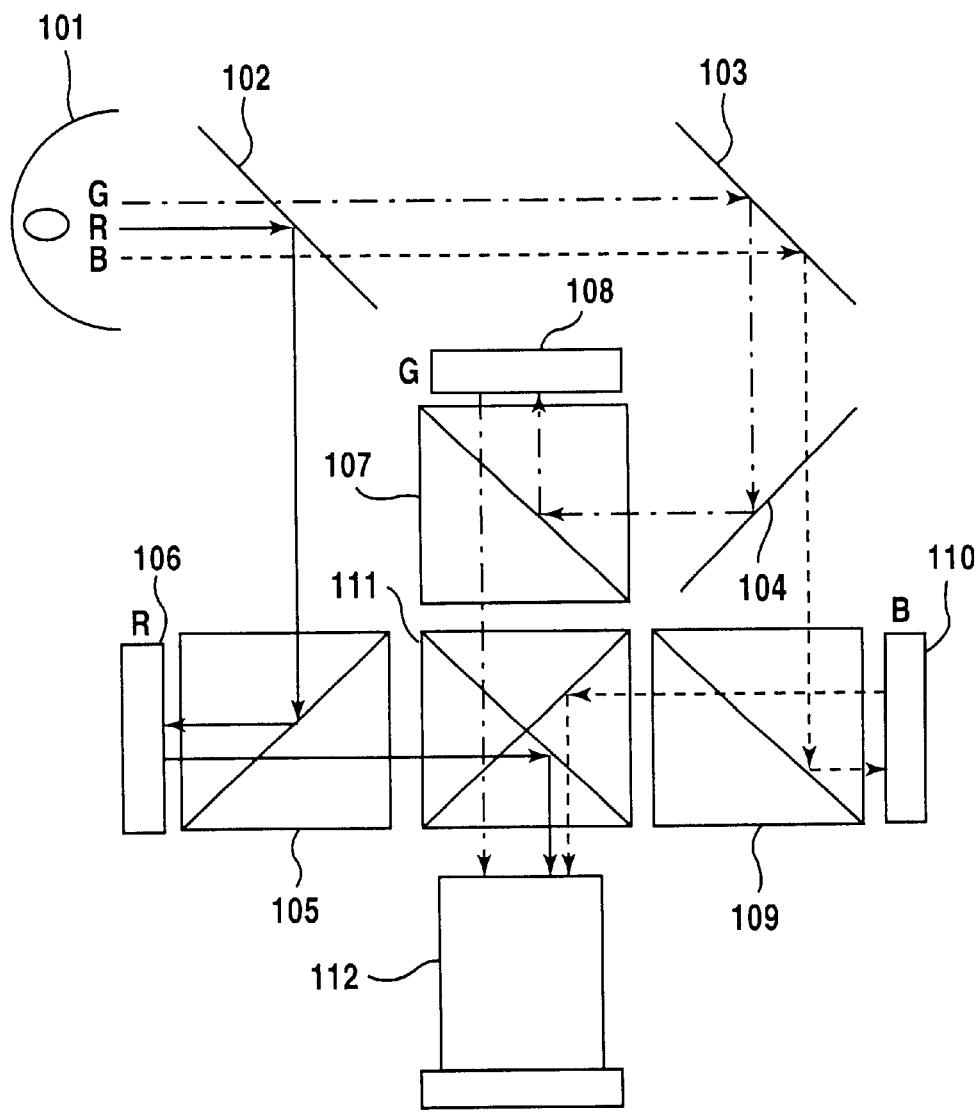
FIG. 5 is a diagram showing the schematic configuration of a conventional projecting apparatus.

The first and the second dichroic beam splitters 21a, 51a in this embodiment may be replaced by the first and the second dichroic mirrors 21b, 51b for reflecting the red light and transmitting the green and blue lights as shown in FIG. 4, respectively. In this case, the first and the second dichroic mirrors 21b, 51b may be formed by a single sheet.

Although, in each of the aforesaid respective embodiments, the explanation has been made as to the case where the present invention is applied to the projection unit 92 of the projecting apparatus of rear projection display, the present invention may be applied to the projecting apparatus of front projector.

The major surface of the PBS used in each of the aforesaid respective embodiments means four surfaces thereof excepting the two surfaces including the combining portion of the polarization separation surface.

According to the present invention, since the second PBS is used for separating the second and third lights and for combining the second and third image lights modulated by the corresponding liquid crystal panels of reflection type, respectively, it is not necessary to let the light transmit an excessive path by using dichroic mirrors for color separation and a reflection mirror or the like, so that the liquid crystal projecting apparatus can be miniaturized.

What is claimed is:

1. A liquid crystal projecting apparatus comprising:

a light source portion for emitting light with predetermined polarization direction;

a color separating portion for separating the light emitted from said light source portion into first separation light including a first color component of three primary colors and second separation light including a second and a third color components having different polarization direction to each other, and for emitting the first and the second separation lights to different directions perpendicular to each other;

a first polarization beam splitter disposed on the light emitting side of the first separation light of said color separating portion and having a first light modulating element of reflection type disposed on a major surface thereof on which the first separation light is incident;

a second polarization beam splitter disposed on the light emitting side of the second separation light of said color separating portion, and having a second light modulating element of reflection type disposed on a major surface thereof on which the second color component of the second separation light is incident and having a third light modulating element of reflection type disposed on a major surface thereof on which the third color component of the second separation light is incident;

a color combining portion for combining the lights of the respective color components emitted from said first and said second polarization beam splitters; and a projection optics for projecting the combined light combined by said color combining portion.

2. The liquid crystal projecting apparatus according to claim 1, wherein said color separating portion comprises:
a third polarization beam splitter which has on said light source portion side a first polarization direction rotating portion for rotating a polarization direction of the first color component by 90 degrees and has on said second polarization beam splitter side a second polarization direction rotating portion for rotating polarization direction of the second color component by 90 degrees, and said color combining portion comprises:
a fourth polarization beam splitter which has on said second polarization beam splitter side a third polarization direction rotating portion for rotating polarization direction of the second color component by 90 degrees.

3. The liquid crystal projecting apparatus according to claim 1, wherein each of said color separating portion and said color combining portion comprises:
an optical device which have dichroic surface for reflecting the first color component and transmitting the second and the third color components, and
said color separating portion has on said second polarization beam splitter side a polarization direction rotating portion for rotating polarization direction of the second color component by 90 degrees.

4. The liquid crystal projecting apparatus according to claim 2, wherein each of said polarization direction rotating portions comprises:
a narrow band retarder corresponding to the color component which polarization direction is to be rotated.

5. The liquid crystal projecting apparatus according to claim 3, wherein each of said polarization direction rotating portions comprises:
a narrow band retarder corresponding to the color component which polarization direction is to be rotated.

6. The liquid crystal projecting apparatus according to claim 1, wherein each of said light modulating elements of reflection type comprises:
a ferroelectric liquid crystal panel.

7. A liquid crystal projecting apparatus comprising:
a light source portion for emitting light of predetermined polarized components;
a color separating portion for separating the light emitted from said light source portion into a first color light including one color of three primary colors R, G, B, and a second color light including remaining two colors;
a first polarization beam splitter disposed on the light emitting side of the first color light of said color separating portion;
a first light modulating element of reflection type disposed on a major surface of said first polarization beam splitter;

a second polarization beam splitter disposed on the light emitting side of the second color light of said color separating portion;
a second and a third light modulating elements of reflection type disposed on two adjacent major surfaces of said second polarization beam splitter, respectively;
a color combining portion for combining the respective color lights emitted from said first and said second polarization beam splitters; and
a projection optics for projecting the combined light combined by said color combining portion.

8. The liquid crystal projecting apparatus according to claim 7, wherein said color separating portion comprises:
a third polarization beam splitter which has on said light source portion side a first polarization direction rotating portion for rotating polarization direction of the first color component by 90 degrees and has on said second polarization beam splitter side a second polarization direction rotating portion for rotating polarization direction of the second color component by 90 degrees, and said color combining portion comprises:
a fourth polarization beam splitter which has on said second polarization beam splitter side a third polarization direction rotating portion for rotating polarization direction of the second color component by 90 degrees.

9. The liquid crystal projecting apparatus according to claim 7, wherein each of said color separating portion and said color combining portion comprises:
an optical device which have dichroic surface for reflecting the first color component and transmitting the second and the third color components, and
said color separating portion has on said second polarization beam splitter side a polarization direction rotating portion for rotating polarization direction of the second color component by 90 degrees.

10. The liquid crystal projecting apparatus according to claim 8, wherein each of said polarization direction rotating portions comprises:
a narrow band retarder corresponding to the color component which polarization direction is to be rotated.

11. The liquid crystal projecting apparatus according to claim 9, wherein each of said polarization direction rotating portions comprises:
a narrow band retarder corresponding to the color component which polarization direction is to be rotated.

12. The liquid crystal projecting apparatus according to claims 7, wherein each of said light modulating elements of reflection type comprises:
a ferroelectric liquid crystal panel.

* * * * *